(12) United States Patent
Nakamura et al.

(10) Patent No.: US 10,239,174 B2
(45) Date of Patent: Mar. 26, 2019

(54) MACHINE TOOL (71) Applicant: O-M LTD., Osaka-shi, Osaka (JP)

(72) Inventors: Takio Nakamura, Nagaoka (JP);
Masaki Negami, Nagaoka (JP);
Hirofumi Nakakubo, Nagaoka (JP);
Akihiro Goto, Nagaoka (JP)

(73) Assignee: O-M LTD., Osaka-shi, Osaka (JP)

(*) Notice: Subject to any disclaimer, the term of this patent is extended or adjusted under 35 U.S.C. 154(b) by 0 days.

(21) Appl. No.: 15/656,143

(22) Filed: Jul. 21, 2017

(65) Prior Publication Data
US 2018/0065224 A1 Mar. 8, 2018

(30) Foreign Application Priority Data

Sep. 2, 2016 (JP) .................................. 2016-171986

(51) Int. Cl.
*B23Q 11/08* (2006.01)
*B23B 3/10* (2006.01)
*B23Q 11/00* (2006.01)

(52) U.S. Cl.
CPC ............ *B23Q 11/0825* (2013.01); *B23B 3/10* (2013.01); *B23Q 11/0891* (2013.01); *B23Q 11/0078* (2013.01); *B23Q 11/08* (2013.01)

(58) Field of Classification Search
CPC ... Y10T 409/30392; Y10T 409/309576; Y10T 409/401925; Y10T 409/4021; Y10T 409/407525; B23Q 11/0825; B23Q 11/0891; B23Q 11/0078; B23Q 11/0089; B23Q 11/0096; B25B 27/00; B25B 27/02; B25B 27/14; B25B 9/00
See application file for complete search history.

(56) References Cited

U.S. PATENT DOCUMENTS

| 5,897,430 A * | 4/1999 | Haller ................ B23Q 11/0891 451/451 |
| 6,749,495 B2 * | 6/2004 | Grund ................ B23Q 11/0816 409/134 |
| 6,987,241 B2 * | 1/2006 | Hacker .............. B23Q 11/0825 160/222 |
| 2003/0183635 A1 * | 10/2003 | Fujii .................. B23Q 11/0825 220/345.1 |

(Continued)

FOREIGN PATENT DOCUMENTS

JP 5447931 B2 3/2014

*Primary Examiner* — Nicole N Ramos
(74) *Attorney, Agent, or Firm* — Sughrue Mion, PLLC (57) ABSTRACT

The present invention provides a machine tool provided with a cover body having a simple structure, excellent operability, and low manufacturing cost. A tool post movement region one-side-closing cover part (9) for closing a tool post movement region open part (8) is configured so as to be: capable of expanding and contracting in a horizontal movement direction of a tool post (3); arranged facing the tool post (3); elongated by urging means (10) to press against the tool post (3) in a relatively slidable manner and close the tool post movement region open part (8); expanded and contracted by movement of the tool post (3) to hold the tool post movement region open part (8) in a closed state; and provided unconnected to the tool post (3) so that the tool post (3) is relatively slidable with respect to the tool post movement region open part (8) is held in a closed state.

6 Claims, 10 Drawing Sheets (56) References Cited

U.S. PATENT DOCUMENTS

2006/0269375 A1* 11/2006 Takayama .......... B23Q 11/0816
  409/134
2007/0042882 A1* 2/2007 Konvicka .............. B23Q 1/012
  483/14

* cited by examiner

MACHINE TOOL

BACKGROUND OF THE INVENTION

1. Field of the Invention

The present invention relates to a machine tool typified by a vertical lathe or an upright turning center in which vertical operation of a cross rail also occurs during machining.

2. Description of the Related Art

In such a machine tool, an entirely closed cover body enclosing a machining space around a turntable is traditionally provided in order to prevent coolant and swarf from being flung out during machining.

This type of machine tool is configured such that a tool post moves in a horizontal direction along a cross rail, and the tool post and the cross rail also move in a vertical direction along a column; therefore, the enclosure region of a machining space that is enclosed by a cover body changes. As a result, the cover body as shown, for example, in Japanese Patent Publication No. 5447931, is configured so as to keep the enclosure region sealed even when the enclosure region of the machining space is changed.

Japanese Patent Publication No. 5447931 relates to a cover structure for covering a machining space on a bed of a machine tool. Ceiling covers having an L shape in cross-section are provided to the right and left of the tool post, the ceiling covers comprising a vertical plate part having a front surface flush with the front surface of the tool post and a lower plate part having a lower surface flush with the lower surface of the tool post. A door and an upper edge of a front cover are bent rearward and come into contact with the vertical plate part of the ceiling covers. At least one of the ceiling covers is provided between a first sliding position adjacent to the tool post and a second sliding position set apart by a prescribed distance from the tool post, so as to be capable of sliding along the cross rail. A drive mechanism for causing the ceiling covers to slide as needed to the first and second slide positions is provided between the slidable ceiling covers and the tool post. The left and right of the tool post can be reliably closed off by the lower plate part of the ceiling cover, contact between the vertical plate part of the ceiling cover and the door is maintained even when the cross rail moves in the vertical direction, and the region above the machining space can be sealed. Furthermore, because the ceiling cover can be made to slide, a wide workpiece feed-in route can be ensured, and a workpiece can be fed in or out without interference from the ceiling cover.

PRIOR-ART DOCUMENTS

Patent Documents

[Patent Document 1] JP Patent Publication No. 5447931

However, a machine tool having a cover structure such as that indicated in Japanese Patent Publication No. 5447931 has problems in that, among the L-shaped ceiling covers provided to the right and left of the tool post, the fixed-side ceiling cover is a simple structure, but the ceiling cover configured to be separate from the tool post has a complicated structure, and therefore tends to develop operational faults (defects), and moreover, has a structure for which a reinforcing guide part is necessary to provide rigidity, and therefore the manufacturing costs are increased.

SUMMARY OF THE INVENTION

In view of the current state of the art as indicated above, an object of the present invention is to provide a machine tool provided with a cover body having a simple structure, excellent operability, and low manufacturing costs.

A summary of the present invention will be described with reference to the accompanying drawings.

A machine tool configured of a column 1, a cross rail 2 provided so as to be moveable in a vertical direction on the column 1, a tool post 3 provided so as to be moveable in a horizontal direction on the cross rail 2, a turntable 4 for rotating a workpiece to be worked by a tool provided to the tool post 3, and an open-part-closing cover body for closing, in an openable and closeable manner, a front-surface-side open part 6 and a ceiling-side open part 7 in a machining chamber 5 provided with the turntable 4, the machine tool configured so that during workpiece machining, machining is performed while the front-surface-side open part 6 and the ceiling-side open part 7 are closed off by the open-part-closing cover body to prevent coolant and swarf from being flung out, wherein the open-part-closing cover body has a tool post movement region one-side-closing cover part 9 for closing, in an openable and closeable manner, a tool post movement region open part 8, which is a movement region of the tool post 3 in the ceiling-side open part 7; the tool post movement region one-side-closing cover part 9 is configured so as to be: capable of elongation and contraction in the horizontal movement direction of the tool post 3; arranged facing the tool post 3 on one side of the tool post in the horizontal movement direction of the tool post 3; during workpiece machining, elongated by urging means 10 so that a tip part thereof presses against the tool post 3 in a relatively slidable manner and the tool post movement region open part 8 is closed; contracted by pushing from the tool post 3 due to movement to one side of the tool post 3 in the horizontal movement direction and elongated following movement to the other side in the horizontal movement direction, which is the side opposite the one side in the horizontal movement direction, to hold the tool post movement region open part 8 in a closed state; and provided unconnected to the tool post 3 so that the tool post slides relative to the tool post movement region one-side-closing cover part 9 even when the tool post 3 moves vertically due to the vertical movement of the cross rail 2, and the tool post movement region open part 8 is held in a closed state.

The machine tool according to the first aspect, wherein the tool post movement region one-side-closing cover part 9 is provided unconnected to the tool post 3 and the cross rail 2, has a configuration in which the tip part presses against the tool post 3 in a relatively slidable manner and a side edge part is in contact with the cross rail 2 in a relatively slidable manner, and is configured so that when the tool post 3 moves vertically in accompaniment with the vertical movement of the cross rail 2, the cross rail 2 and the tool post 3 slide relative to the tool post movement region one-side-closing cover part 9 and move vertically while the tool post movement region open part 8 is held in a closed state.

The machine tool according to the first aspect, wherein the open-part-closing cover body has a tool post movement region other-side-closing cover part 11 for closing the tool post movement region open part 8 along with the tool post movement one-side-closing cover part 9, and the tool post movement region other-side-closing cover part 11 is provided to the other side of the tool post 3 in the horizontal movement direction, and is configured so as to close the tool post movement region open part 8 formed when the tool post 3 has moved to one side in the horizontal movement direction and the tool post movement region one-side-closing cover part 9 has contracted.

The machine tool according to the first aspect, wherein the open-part-closing cover body is configured of: a front-surface-side cover part 12 for closing the front-surface-side open part 6 in an openable and closeable manner; the tool post movement region one-side-closing cover part 9 for closing, in an openable and closeable manner, the tool post movement region open part 8 in which the movement region is changed by the movement of the tool post 3 in the ceiling-side open part 7; a tool post movement region other-side-closing cover part 11 for closing the tool post movement region open part 8 along with the tool post movement region one-side-closing cover part 9; and a tool post non-movement region closing cover part 14 for closing, in an openable and closeable manner, a tool post non-movement region open part 13 that is not the movement region of the tool post in the ceiling-side open part 7.

The machine tool according to the first aspect, wherein a pressure-reducing circuit is provided to the urging means 10, and a configuration is adopted such that the elongation urging force on the tool post movement region one-side-closing cover part 9 can be adjusted.

Due to being configured as described above, the prevent invention is a machine tool in which a cross rail and tool post move vertically, wherein an open-part-closing cover body for preventing coolant and swarf from being flung out during workpiece machining has a simper configuration and can be more easily designed than a conventional L-shaped cover (a cover corresponding to the tool post movement region one-side-closing cover part of the present invention), the operability and the usability of the open-part-closing cover body are improved, and the open-part-closing cover body can be manufactured inexpensively. This yields an exceptionally practical machine tool that is provided with a cover body that has a simple structure, while being highly convenient to operate, and capable of being inexpensive to manufacture.

DESCRIPTION OF THE PREFERRED EMBODIMENTS

A preferred embodiment of the present invention will be described simply hereinafter on the basis of the drawings in order to show the action of the present invention.

A tool post movement region one-side-closing cover part 9 of the present invention elongates and contracts in accompaniment with the movement of a tool post 3 to hold, in a closed state, a tool post movement region open part 8 in which the tool post 3 moves along a cross rail 2, the tool post 3 being positioned in a part of a ceiling-side open part 7 of a machining chamber 5; i.e., a machining space enclosing a turntable 4, and, more specifically, positioned to the rear of the ceiling-side open part 7.

In other words, the tool post movement region one-side-closing cover part 9 is provided facing the tool post 3 with the tool post movement region open part 8 interposed therebetween, and the tool post movement region open part 8 is closed by the tool post movement region one-side-closing cover part 9 elongating toward the tool post 3 side and a tip part of the elongated tool post movement region one-side-closing cover part 9 pressing against the tool post 3.

The tool post movement region one-side-closing cover part 9 is elongated by urging means 10. That is, at least during workpiece machining, a force for providing constant elongating is exerted by elongation urging from the urging means 10, the tool post movement region one-side-closing cover part 9 of the present invention comes into contact with the tool post 3 so as to press the tool post 3, and in cases in which the tool post 3 is moved to a side (other side in a horizontal movement direction) opposite one side in a horizontal movement direction (side to which the tool post movement region one-side-closing cover part 9 is provided), the tool post movement region one-side-closing cover part 9 is elongated while maintaining a state of pressing against the tool post 3 due to the elongation urging, and the tool post movement region open part 8 is held in a closed state.

The tool post movement region one-side-closing cover part 9 of the present invention is contracted by pushing from the tool post 3. That is, elongation urging from the aforementioned urging means 10 is set to a urging force that is small enough not to obstruct movement of the tool post 3, the tool post 3 moves to one side in the horizontal movement direction (side to which the tool post movement region one-side-closing cover part 9 is provided) against the urging force, whereby the tool post movement region one-side-closing cover part 9 contracts. When contraction occurs, the tool post movement region one-side-closing cover part 9 comes into contact with (presses against) the tool post 3, whereby the tool post movement region open part 8 is held in a closed state during contraction as well.

The tool post movement region one-side-closing cover part 9 of the present invention is provided unconnected to the tool post 3. That is, the tool post 3 is provided to the cross rail 2 and operates vertically in accompaniment with the vertical motion of the cross rail 2, but the unconnected tool post movement region one-side-closing cover part 9, or in other words, the tool post movement region one-side-closing cover part 9 configured as a separate body from the tool post 3, is not affected by the vertical operation of the cross rail 2 and the tool post 3, and the tool post 3 slides relative to the tool post movement region one-side-closing cover part 9 when the tool post 3 moves vertically. In other words, the tip part of the tool post movement region one-side-closing cover part 9 pressing against the tool post 3 slides in a relatively vertical direction relative to the vertical motion of the tool post 3. Accordingly, the tool post movement region one-side-closing cover part 9 holds the tool post movement region open part 8 in a closed state without vertical motion even when the tool post 3 moves vertically.

Thus, the tool post movement region one-side-closing cover part 9 in the present invention is configured so as to be: capable of expansion and contraction in the horizontal movement direction of the tool post 3; arranged facing the tool post 3 on one side of the tool post 3 in the horizontal movement direction, provided with the urging means 10, and elongated by the urging means 10; contracted by pushing from the tool post 3 when in an elongated state; and provided unconnected to the tool post 3. Accordingly, in a machine tool in which the cross rail 2 and the tool post 3 move vertically, an open-part-closing cover body for preventing coolant and swarf from being flung out during workpiece machining can have a simpler configuration and be more easily designed than when using a conventional L-shaped cover (a cover corresponding to the tool post movement region one-side-closing cover part 9 of the present invention), the operability and usability of the open-part-closing cover body can be improved, and the open-part-closing cover body can be manufactured at low cost.

Accordingly, the present invention is a machine tool having excellent practical use for providing a cover body that has a simple structure and excellent operability, and that can be manufactured at low cost.

EXAMPLES

Detailed examples of the present invention will be described on the basis of the drawings.

The present example is a machine tool configured of a column 1, a cross rail 2 provided so as to be moveable in the vertical direction on the column 1, a tool post 3 provided so as to be moveable in the horizontal direction on the cross rail 2, a turntable 4 on which a workpiece to be worked by a tool provided to the tool post 3 is rotated, and an open-part-closing cover body for closing, in an openable and closeable manner, a front-surface-side open part 6 and a ceiling-side open part 7 of a machining chamber 5 in which the turntable 4 is provided. The machine tool is configured so that during workpiece machining, machining is performed while the front-surface-side open part 6 and the ceiling-side open part 7 are closed by the open-part-closing cover body to prevent coolant and swarf from being flung out.

That is, the present example is a machine tool configured so that not only does the tool post 3 move in the horizontal direction, but the cross rail 2 and the tool post 3 also move in the vertical direction, whereby a configuration is adopted so that the state of the machining space enclosing the turntable 4 in the machining chamber 5 is changed not only by the movement of the tool post 3 in the horizontal direction but also by the movement of the cross rail 2 and the tool post 3 in the vertical direction, and even when the state of the machining space is changed, the open-part-closing cover body holds the front-surface-side open part 6 and the ceiling-side open part 7 in a closed state to prevent coolant and swarf from being flung out.

The open-part-closing cover body of the present example shall be described in detail below.

The open-part-closing cover body of the present example is configured of a front-surface-side-closing cover part 12 for closing the front-surface-side open part 6 in an openable and closeable manner, a tool post movement region one-side-closing cover part 9 for closing, in an openable and closeable manner, a tool post movement region open part 8 in which an open part region is changed by movement of the tool post 3 in the ceiling-side open part 7, a tool post movement region other-side-closing cover part 11 for closing the tool post movement region open part 8 along with the tool post movement region one-side-closing cover part 9, and a tool post non-movement-region-closing cover part 14 for closing, in an openable and closeable manner, a tool post non-movement region open part 13 that is not in the movement region of the tool post 3 in the ceiling-side open part 7.

Specifically, the front-surface-side-closing cover part 12 of the present example is configured of two upright plate members, and is provided to a device anterior surface so as to slide in a right-left direction.

More specifically, the front-surface-side-closing cover parts approach and separate from each other to open and close the front-surface-side open part 6.

The tool post non-movement-region-closing cover part 14 of the present example closes, in an openable and closeable manner, the tool post non-movement region open part 13 that is not in the movement region of the tool post 3 in the ceiling-side open part 7, which is in connection with the front-surface-side open part 6 closed by the aforementioned front-surface-side-closing cover part in an openable and closeable manner. The tool post non-movement-region-closing cover part 14 is configured of two flat plate members and is provided to the anterior side of the device so as to slide in the right-left direction.

Specifically, the tool post non-movement-region-closing cover parts 14 are integrally formed with the aforementioned front-surface-side-closing cover parts 12, and therefore work together with the movement of the front-surface-side-closing cover parts 12 to approach and separate from each other to open and close the tool post non-movement region open part 13.

That is, the present example has a configuration in which the front-surface-side-closing cover part 12 and the tool post non-movement-region-closing cover part 14 are integrally molded and are formed as an L-shaped front-surface door part 15, and the front-surface-side open part 6 and the tool post non-movement region open part 13 are simultaneously closed in an openable and closeable manner by a sliding open/closed operation of the front-surface door part 15.

The tool post movement region one-side-closing cover part 9 of the present example is configured so as to be: capable of expansion and contraction in the horizontal movement direction of the tool post 3; arranged facing the tool post 3 on one side (left side when viewed from the front surface in the present example) of the tool post 3 in the horizontal movement direction; at least during workpiece machining, elongated by the urging means 10 to reach a state in which the tip part thereof presses against the tool post 3 in a relatively slidable manner, and to close the tool post movement region open part 8 (specifically, the tool post movement region left-side open part 8A formed on the left side of the tool post 3 in the tool post movement region open part 8); contracted by pushing from the tool post 3 due to movement to one side of the tool post 3 in the horizontal movement direction and elongated in correspondence with movement to the other side in the horizontal movement direction (right side when viewed from the front surface in the present invention), which is the side opposite the one side in the horizontal movement direction, to hold the tool post movement region open part 8 in a closed state; and provided unconnected to the tool post 3 so that the tool post slides relative to the tool post movement region one-sideclosing cover part 9 even when the tool post 3 moves vertically due to the vertical movement of the cross rail 2, and the tool post movement region open part 8 is held in a closed state.

Specifically, the tool post movement region one-side-closing cover part 9 of the present example is provided unconnected to the tool post 3 and the cross rail 2, and has a configuration in which the tip part thereof presses against the tool post 3 in a relatively slidable manner and a side edge part is in contact with the cross rail 2 in a relatively slidable manner. The tool post movement region one-side-closing cover part 9 of the present example is configured so that even when the tool post 3 moves vertically in accompaniment with the vertical movement of the cross rail 2, the cross rail 2 and the tool post 3 slide relative to the tool post movement region one-side-closing cover part 9, and the tool post movement region open part 8 is held in a closed state.

More specifically, the tool post movement region one-side-closing cover part 9 is configured of a plurality of cover members 16 provided in a nested state and the urging means 10 for applying elongation urging to the cover members 16.

Figure 1:
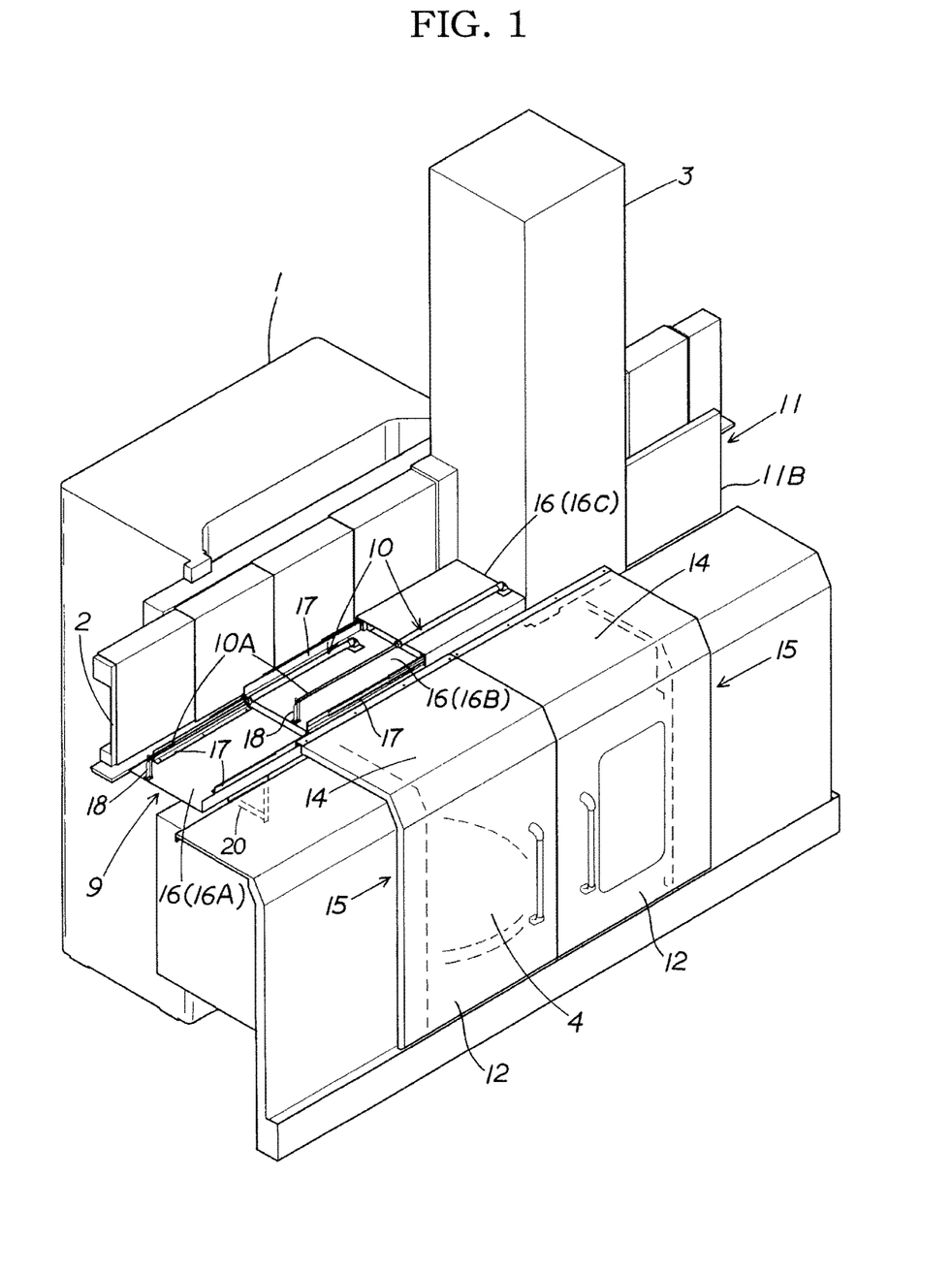
FIG. 1 is an illustrative perspective view of the present example (with an open part being fully closed in a tool post standby position)
Figure 2:
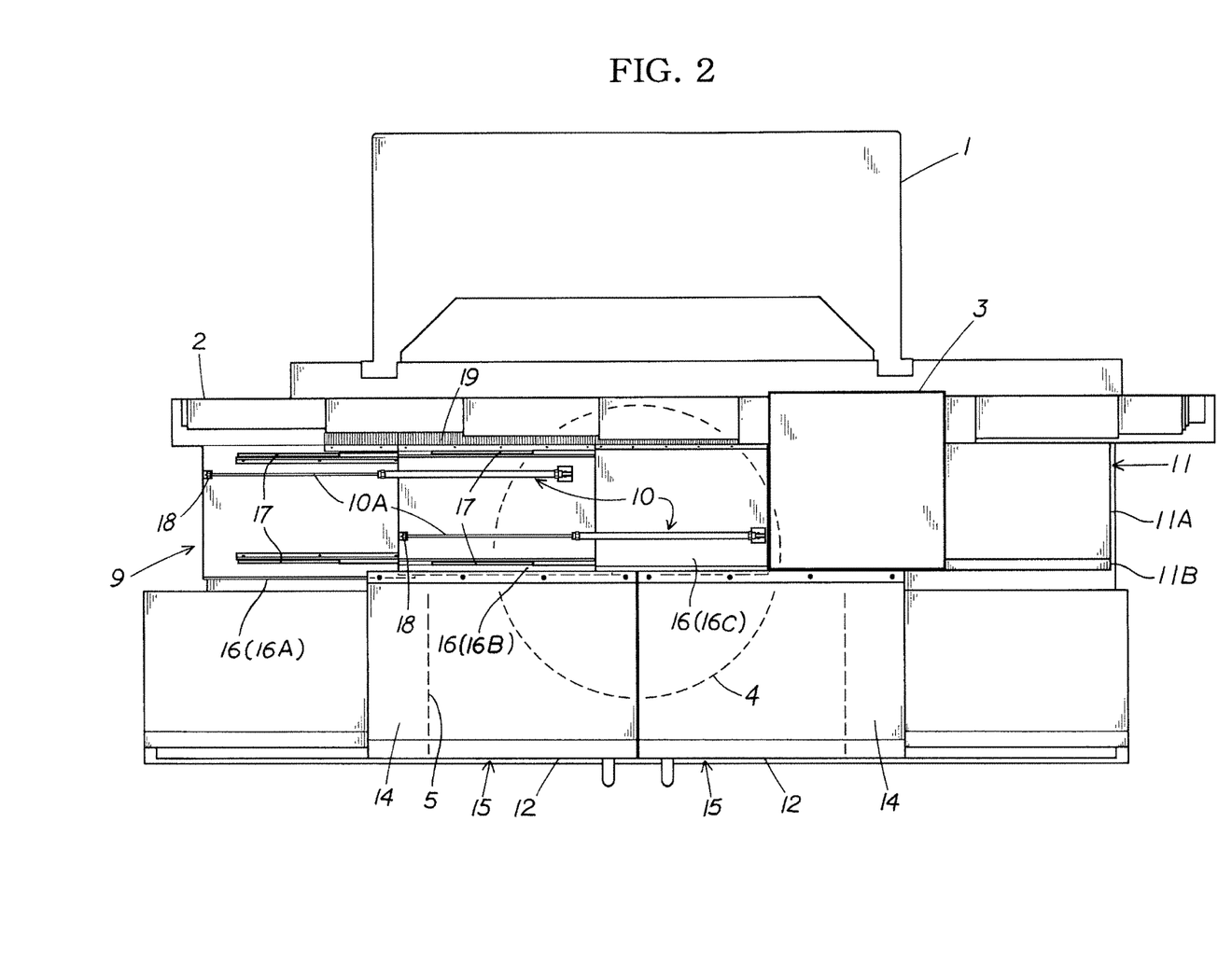
FIG. 2 is an explanatory plan view of the present example that corresponds to FIG. 1.
Figure 3:
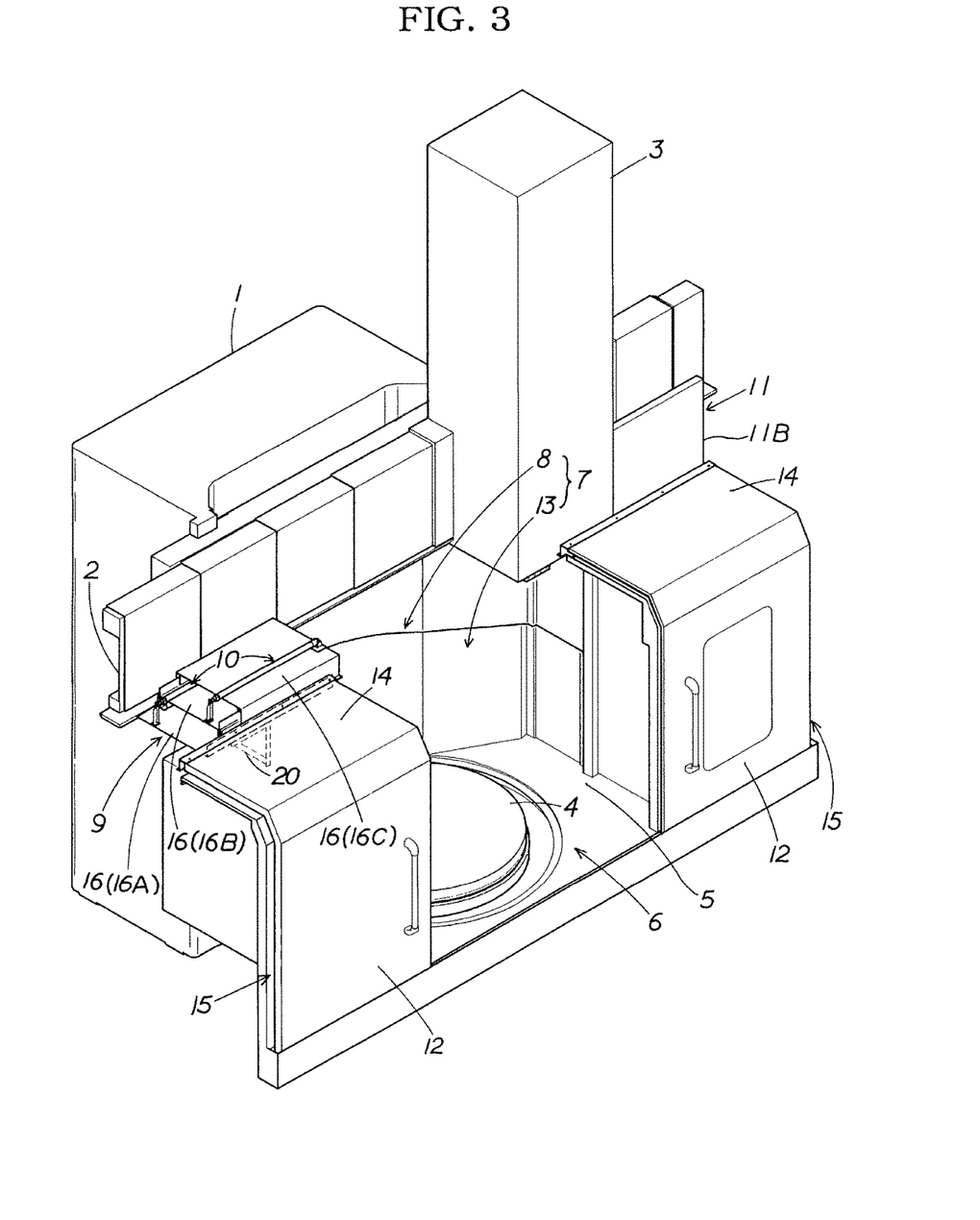
FIG. 3 is an illustrative perspective view of the present example (with an open part being fully open in the tool post standby position)
Figure 4:
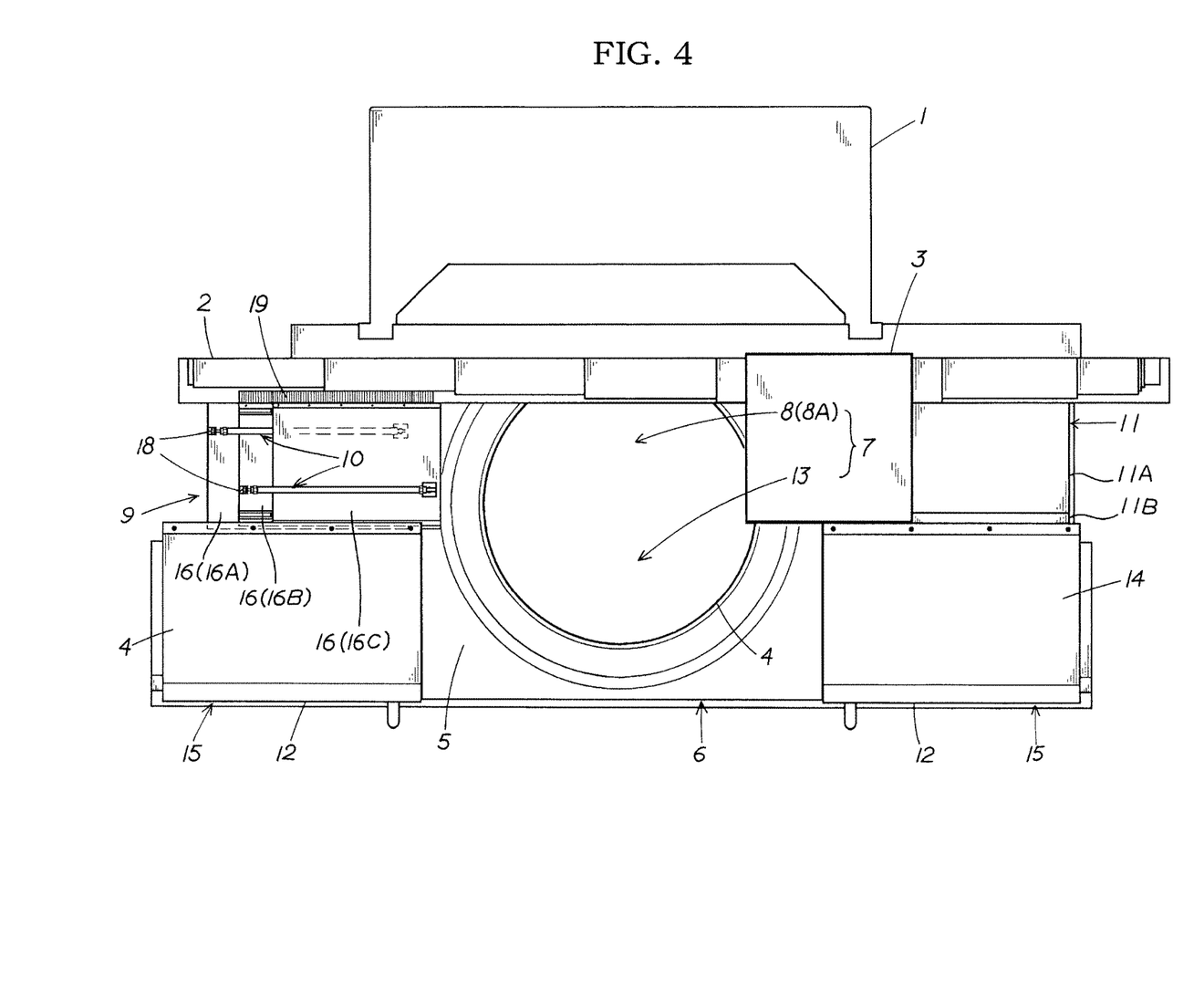
FIG. 4 is an explanatory plan view of the present example that corresponds to FIG. 3.
Figure 5:
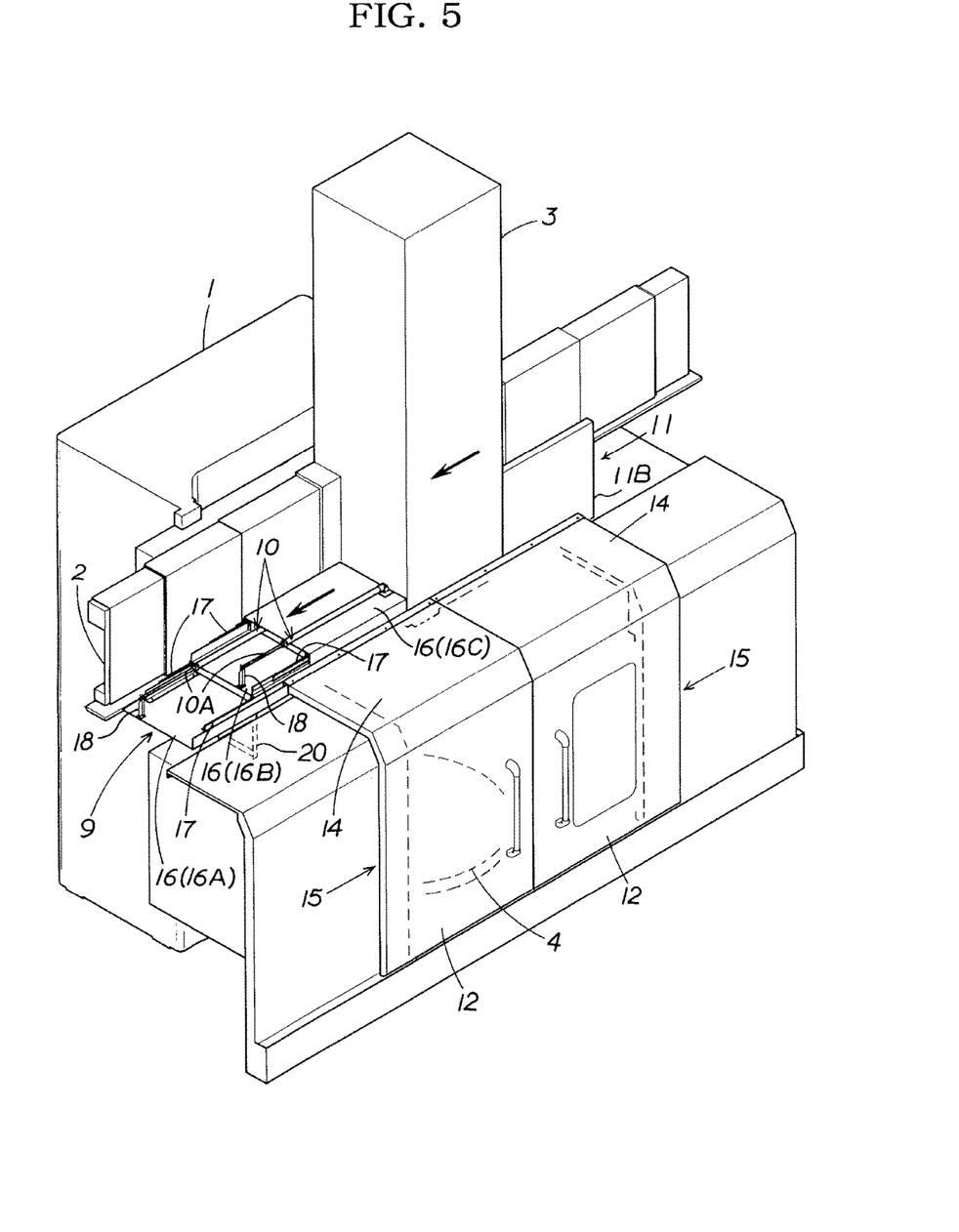
FIG. 5 is an illustrative perspective view of the present example (with an open part being fully closed in a tool post machining position)
Figure 6:
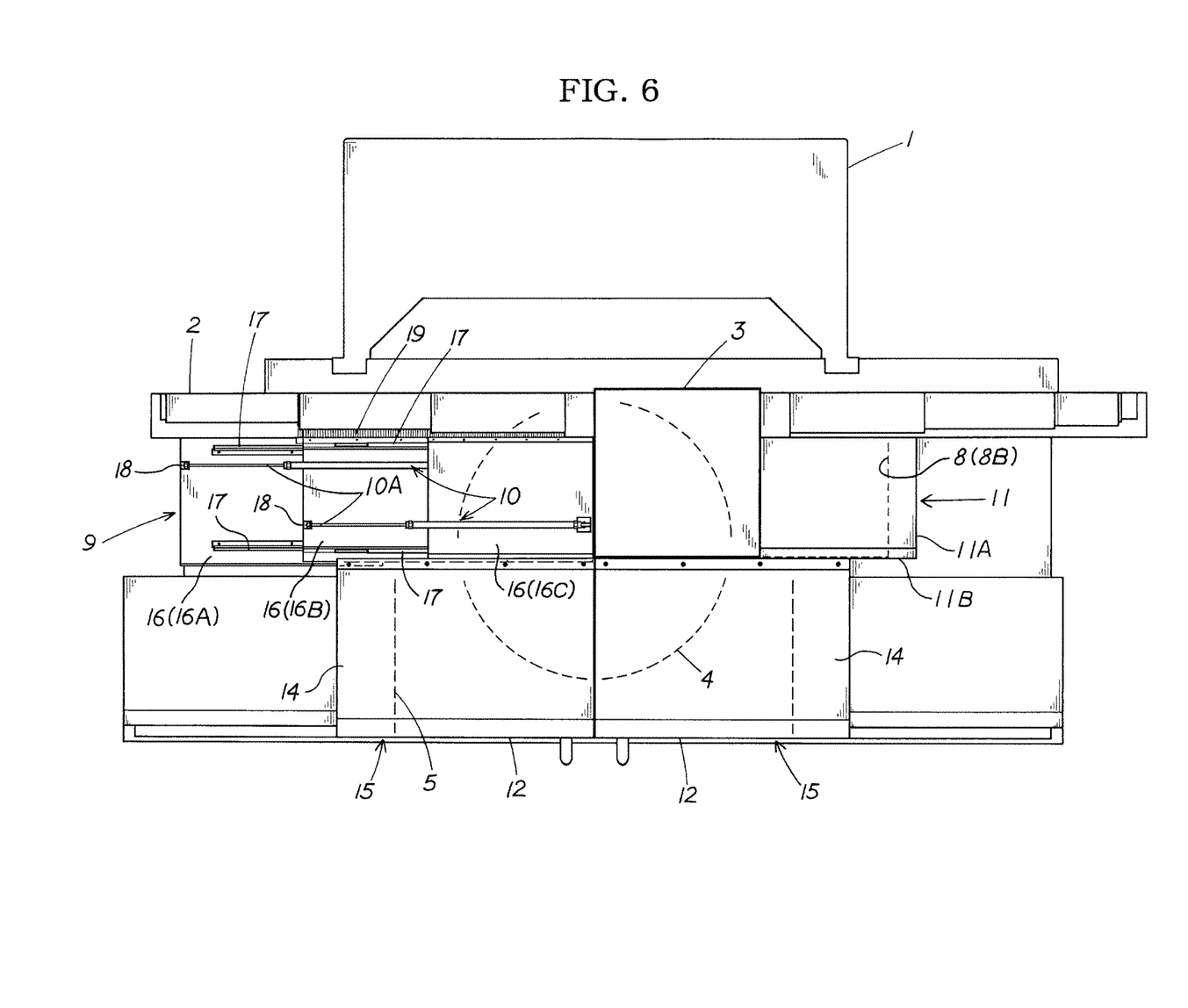
FIG. 6 is an explanatory plan view of the present example that corresponds to FIG. 5.
Figure 7:
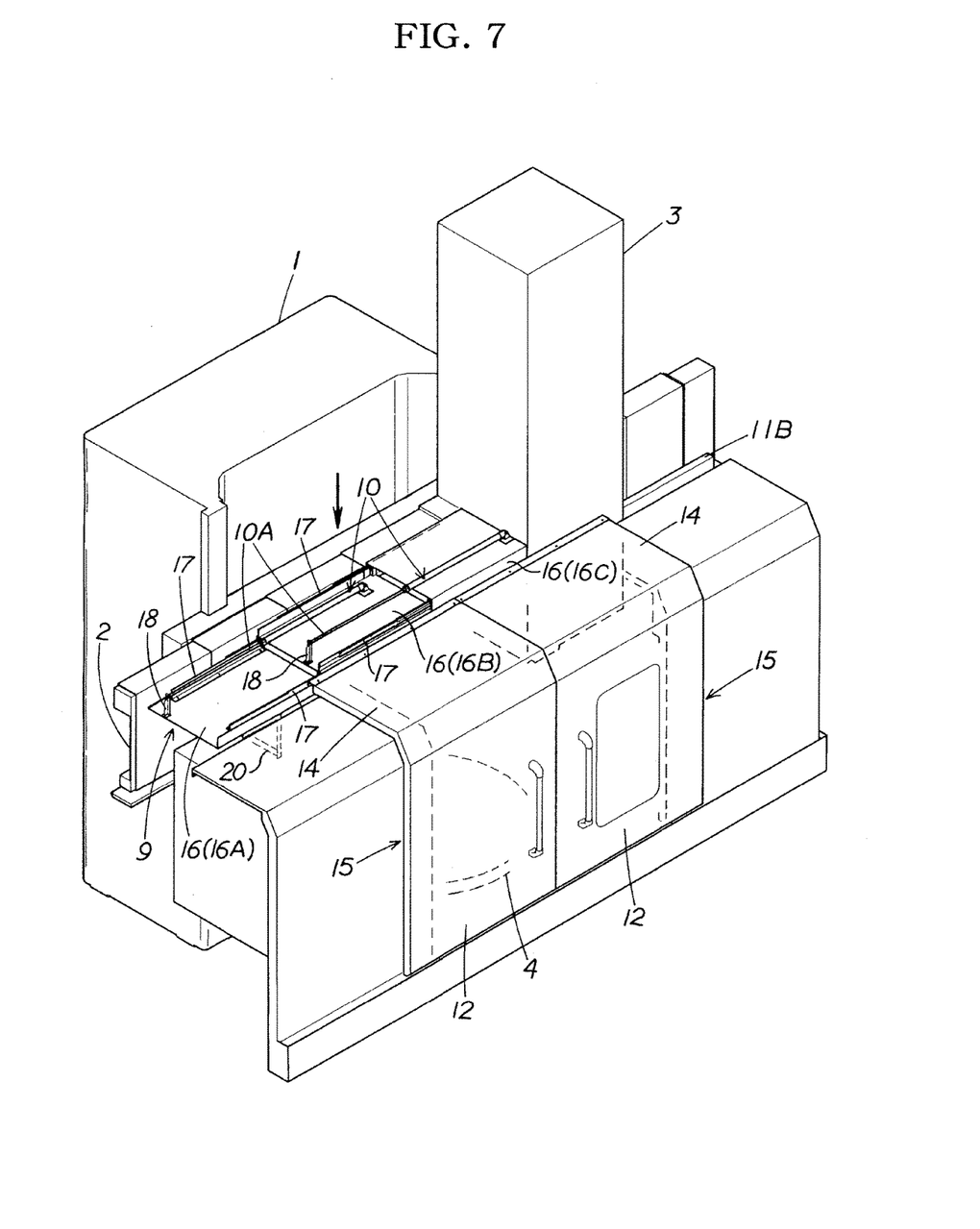
FIG. 7 is an illustrative perspective view of the present example (with an open part being fully closed in a tool post standby position and in a position in which a cross rail and a tool post move downward)
Figure 8:
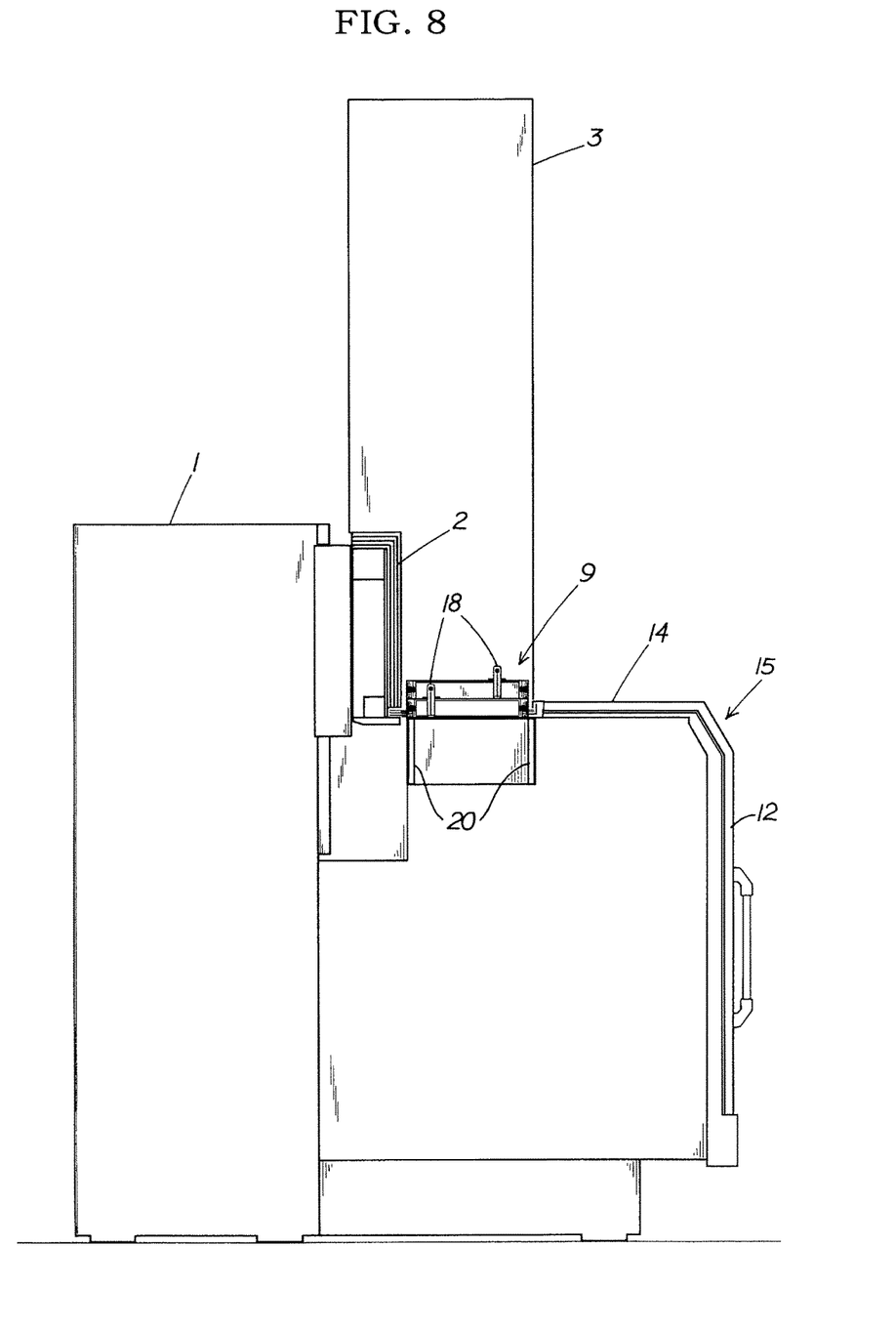
FIG. 8 is an explanatory side view of the present example.
Figure 9:
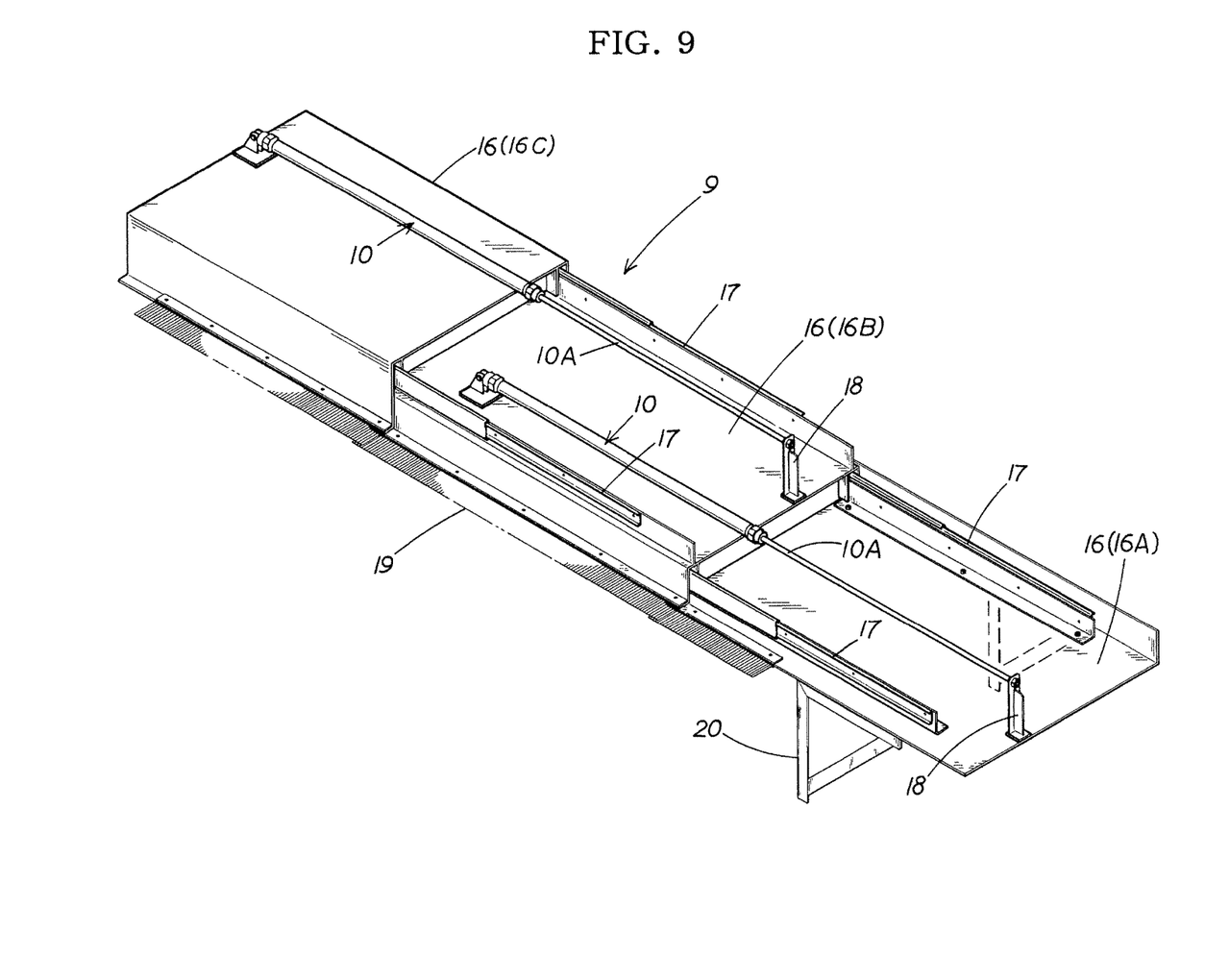
FIG. 9 is an illustrative perspective view of a tool post movement region one-side-closing cover part (elongated state) of the present example.
Figure 10:
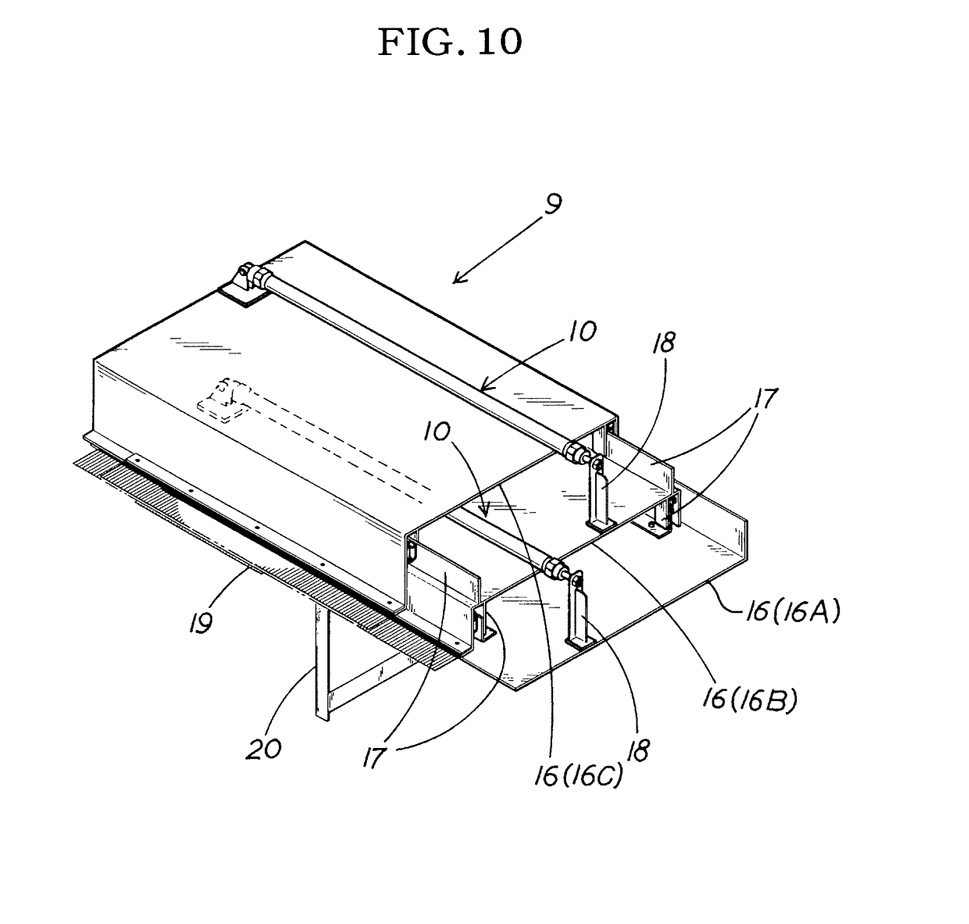
FIG. 10 is an illustrative perspective view of a tool post movement region one-side-closing cover part (contracted state) of the present example.

Even more specifically, the tool post movement region one-side-closing cover part 9 of the present example is configured of: three cover members 16; i.e., a first cover member 16A provided to a machine tool main body in a fixed state, a second cover member 16B provided so as to slidably overlap the first cover member 16A, and a third cover member 16C provided so as to slidably overlap the second cover member 16B; and two urging means 10; i.e., first urging means 10 for applying elongation urging to the third cover member 16B, and second urging means 10 for applying elongation urging to the third cover member 16C. The present example uses an air cylinder device 10 for each urging means 10, and hereinafter, the urging means 10 is referred to as the air cylinder device 10.

In more detail, the first cover member 16A and the second cover member 16B are provided with a cylinder connection part 18 in which the air cylinder device 10, specifically, a cylinder rod 10A of the air cylinder device 10, is connected to a slide rail 17, the second cover member 16B is further provided with a first air cylinder device 10, the third cover member 16C is provided with a second air cylinder device 10, the second cover member 16B is slidably provided to the slide rail part 17 provided to the first cover member 16A, and the third cover member 16C is slidably provided to the slide rail 17 provided to the second cover member 16B.

The first air cylinder device 10 provided to the second cover member 16B is connected to the cylinder connection part 18 in which the cylinder rod 10A is provided to the first cover member 16A, and the second cover member 16B has a configuration in which elongation urging is applied by the actuation of the first air cylinder device 10 to elongate the first cover member 16A, the second air cylinder device 10 provided to the third cover member 16C is connected to the cylinder connection part 18 in which the cylinder rod 10A is provided to the second cover member 16B, and the third cover member 16C has a configuration in which elongation urging is applied by the actuation of the second air cylinder device 10 to elongate the second cover member 16B.

The side edge part of the cover members 16 on the cross rail side is filled with a gap-filling member 19 for filling the gap created with the cross rail 2.

Specifically, the gap-filling member 19 is formed by a flexible member such as a brush, and is configured to make deformable contact with the cross rail 2 (specifically, the cross rail cover), fill the gap between the tool post movement region one-side-closing cover part 9 and the cross rail 2, and prevent coolant and swarf from being flung out from the gap as well as allow the cross rail 2 to smoothly slide relative to the tool post movement region one-side-closing cover part 9.

The tip part of the tool post movement region one-side-closing cover part 9 that slides in a relative manner with respect to the tool post 3, specifically, the tip part of the third cover member 16C, may have a configuration in which a slide-promoting member (roller or similar brush-shaped member or the like) for making a smooth sliding operation possible, as with the side edge part, is provided.

A pressure-reducing circuit is provided to each of the air cylinder devices 10 of the present example, the air cylinder devices 10 being configured so as to be capable of freely adjusting the elongation urging force acting (produced) on the tool post movement region one-side-closing cover part 9.

That is, the elongation urging force can be set to a urging force at which the tool post 3 cannot be pushed, and, when the tool post 3 pushes the tool post movement region one-side-closing cover part 9, to an urging force of a level at which the pushing movement operation of the tool post 3 can be performed smoothly, with substantially no load being received. Alternatively, when the tool post 3 moves in a direction opposite the direction in which the tool post movement region one-side-closing cover part 9 is pushed; i.e., when the tool post 3 moves in the elongation direction of the tool post movement region one-side-closing cover part 9, the elongation urging force is set to a urging force that cannot push the tool post 3. When the tool post 3 moves in the direction in which the tool post movement region one-side-closing cover part 9 is pushed; i.e., when the tool post 3 moves in the contraction direction of the tool post movement region one-side-closing cover part 9, it is possible for the supply of air to the air cylinder device 10 to be paused and urging force not to be produced (i.e., the urging force is set to zero), and the tool post 3 will not be affected by the elongation urging force of the tool post movement region one-side-closing cover part 9.

The tool post movement region one-side-closing cover part 9 of the present example is contracted by pushing from the tool post 3 during workpiece machining, but the contraction of the tool post movement region one-side-closing cover part 9 occurs even when the tool post movement region one-side-closing cover part 9 is not pushed by the tool post 3 due to the actuation of the air cylinder device 10. For example, the ceiling-side open part 7 can easily be placed into an entirely open state when a large workpiece is placed on the turntable 4 while being hoisted by a crane or the like.

The tool post movement region one-side-closing cover part 9 is configured of three cover members 16, but the number of cover members 16 is not limited thereto. Even the urging means 10 is not limited to the air cylinder device 10 shown in the present example; any device may be applied, as appropriate, as long as the device can apply elongation urging to the cover member 16. Reference number 20 in the drawings is a support leg part 20 for supporting the tool post movement region one-side-closing cover part 9.

The tool post movement region other-side-closing cover part 11 for closing the tool post movement region open part 8 along with the tool post movement region one-side-closing cover part 9 is provided to the side of the tool post 3 opposite the side to which the tool post movement region one-side-closing cover part 9 is provided, moves along with the tool post 3, and closes the tool post movement region open part 8 (specifically, the tool post movement region right-side open part 8B formed on the right side of the tool post 3 in the tool post movement region open part 8) formed when the tool post 3 has moved in a direction for pushing the tool post movement region one-side-closing cover part 9.

Specifically, the tool post movement region other-side-closing cover part 11 of the present example is configured in an L shape formed by a bottom plate part 11A and an upright plate part 11B, the bottom plate part 11A is provided in connection with the tool post 3 so as to be flush with the bottom part of the tool post 3, and is configured so that the bottom plate part 11A closes the tool post movement region right-side open part 8B following the movement of the tool post 3.

Thus, the present example is provided with an open-part-closing cover body having a simpler configuration and being more easily designed than a conventional open-part-closing cover body configured of an L-shaped cover (a cover corresponding to the tool post movement region one-side-closing cover part 9). By providing such an open-part-closing cover body, the operability and usability of the open-part-closing cover body can be improved, and the open-part-closing cover body can be manufactured inexpensively.

Accordingly, the present invention is an exceptionally practical machine tool provided with a cover body that has a simple structure and excellent operability, and that can be manufactured at low cost.

The present invention is not limited to the present example; the specific configuration of structural elements can be designed as appropriate.

What is claimed is:

1. A machine tool comprising:
    a column,
    a cross rail configured to move in a vertical direction on the column,
    a tool post configured to move in a horizontal movement direction on the cross rail,
    a turntable configured to rotate a workpiece to be worked by a tool connected to the tool post,
    an open-part-closing cover body configured to close, in an openable and closeable manner, a front-surface-side open part and a ceiling-side open part in a machining chamber provided with the turntable, and
    an urging means, wherein
    the machine tool is configured so that during workpiece machining, machining is performed while the front-surface-side open part and the ceiling-side open part are closed by the open-part-closing cover body to prevent coolant and swarf from being flung out,
    the open-part-closing cover body comprises a tool post movement region one-side-closing cover part configured to close, in an openable and closeable manner, a tool post movement region open part, which is a movement region of the tool post in the ceiling-side open part, and
    the tool post movement region one-side-closing cover part is configured so as to be:
        capable of elongation and contraction in the horizontal movement direction of the tool post;
        arranged facing the tool post on one side of the tool post in the horizontal movement direction;
        during workpiece machining, elongated by the urging means such that a tip part of the tool post movement region one-side-closing cover part presses against the tool post, the tip part slides with the tool post when the tool post moves in the horizontal movement direction, and the tool post movement region open part is closed;
        while elongated by the urging means such that the tip part presses against the tool post, contracted by the tool post pushing the tip part due to movement of the tool post to one side of the tool post in the horizontal movement direction, and elongated following movement of the tool post, away from the tip part, to an other side in the horizontal movement direction, which is the side opposite the one side in the horizontal movement direction, to hold the tool post movement region open part in a closed state; and
        provided unconnected to the tool post so that the tool post slides relative to the tool post movement region one-side-closing cover part even when the tool post moves vertically due to the vertical movement of the cross rail, and the tool post movement region open part is held in a closed state.

2. The machine tool according to claim 1, wherein
    the tool post movement region one-side-closing cover part is provided unconnected to the tool post and the cross rail, has a configuration in which the tip part presses against the tool post and the press part is slidable in the horizontal movement direction, and a side edge part of the tool post movement region one-side-closing cover part is in contact with the cross rail when the side edge part slides in the horizontal movement direction, and is configured so that when the tool post moves vertically in accompaniment with the vertical movement of the cross rail, the cross rail and the tool post slide relative to the tool post movement region one-side-closing cover part and move vertically while the tool post movement region open part is held in a closed state.

3. The machine tool according to claim 1, wherein the open-part-closing cover body has a tool post movement region other-side-closing cover part configured to close the tool post movement region open part along with the tool post movement one-side-closing cover part, and the tool post movement region other-side-closing cover part is provided to the other side of the tool post in the horizontal movement direction, and is configured so as to close the tool post movement region open part formed when the tool post has moved to the one side in the horizontal movement direction and the tool post movement region one-side-closing cover part has contracted.

4. The machine tool according to claim 1, wherein the open-part-closing cover body further comprises:
    a front-surface-side cover part configured to close the front-surface-side open part in an openable and closeable manner;
    a tool post movement region other-side-closing cover part configured to close the tool post movement region open part along with the tool post movement region one-side-closing cover part; and
    a tool post non-movement region closing cover part configured to close, in an openable and closeable manner, a tool post non-movement region open part that is not the movement region of the tool post in the ceiling-side open part, wherein
    the tool post movement region one-side-closing cover part is configured to close, in an openable and closeable manner, the tool post movement region open part in which the movement region is changed by the movement of the tool post in the ceiling-side open part.

5. The machine tool according to claim 1, wherein the urging means comprises a pressure-reducing circuit, and the urging means is configured to adjust an elongation urging force on the tool post movement region one-side-closing cover part.

6. The machine tool according to claim 1, wherein the open-part-closing cover body is configured to close the front-surface-side open part on a side of the machining chamber that extends parallel to the horizontal movement direction.

* * * * *